April 5, 1966     G. DE WAYNE MILES     3,244,313
CONTAINERS
Filed Oct. 6, 1961
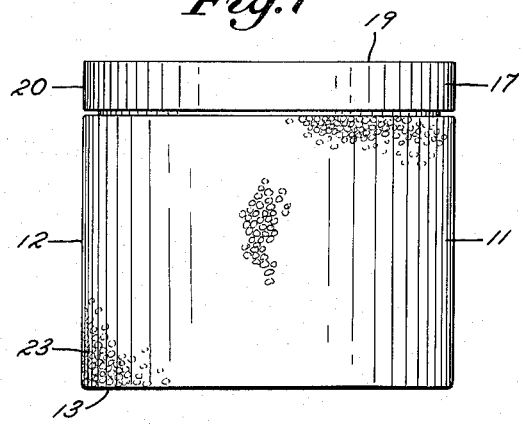
Fig.1
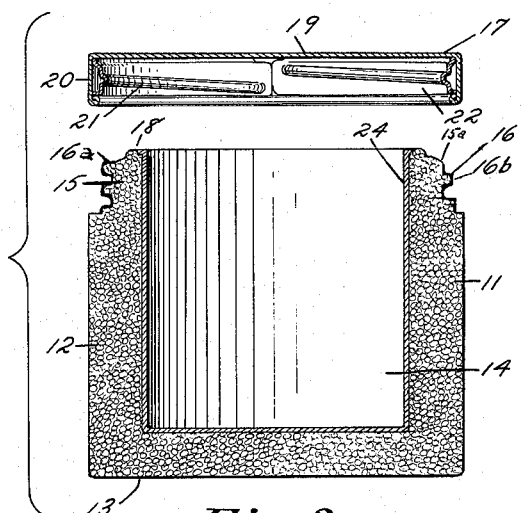
Fig.2
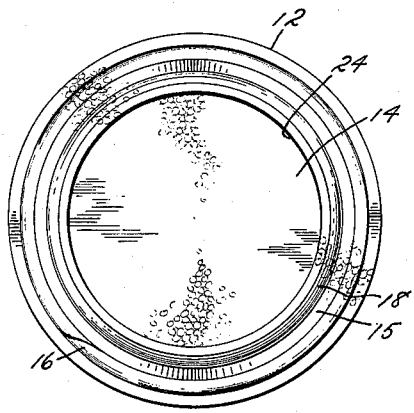
Fig.3
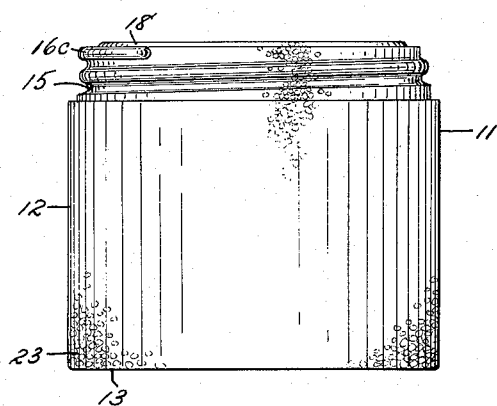
Fig.4
Fig.5
INVENTOR.
GILBERT DEWAYNE MILES
BY
*Thomas M. Hammond*
*Attorney*

United States Patent Office 3,244,313
Patented Apr. 5, 1966

3,244,313
CONTAINERS
Gilbert De Wayne Miles, Ossining, N.Y., assignor to Colgate-Palmolive Company, New York, N.Y., a corporation of Delaware
Filed Oct. 6, 1961, Ser. No. 143,325
2 Claims. (Cl. 220—39)

This invention relates to containers. More particularly, the invention relates to strong light weight containers or jars manufactured from synthetic thermoplastic resinous particulate material capable of expansion to form low density synthetic resin foam plastics, such as polystyrene, polyurethane, polyethylene foams and the like.

The present invention provides such a container or jar, as will be readily apparent from the following description and accompanying drawings in which:

FIG. 1 is a lateral view of a jar made from polystyrene foam with the cover in place;

FIG. 2 is a central vertical sectional view of the jar and cover, the cover being separated from the jar proper;

FIG. 3 is a plan view of the jar with the cover removed;

FIG. 4 is a lateral view of the jar with the cover removed showing rounded threads; and FIG. 5 is a fragmentary sectional view of the jar showing the relationship between the sealing means and a thread comprising a vertical plurality of expanded beads.

Referring to the drawings generally, a preferred form of container or jar having a body 11 manufactured in accordance with the present invention is molded from a mass of synthetic resinous particulate material such as beads or particles or the like containing an expanding agent. The beads or particles are preferably polystyrene which can be expanded to form a relatively low density foam plastic, although polyurethane or polyethylene or any other thermoplastic synthetic resinous material capable of expansion or foaming can also be used. The body 11 forms a unitary wall 12 and bottom 13 that define an internal cavity 14 for the reception of contents.

Integral with body 11 and located at the upper part thereof is a neck section 15 having a perimetric measurement less than that of body 11. Neck section 15 has a plurality of oversized threads 16 disposed on the external vertical surface. The threads 16 are adapted to receive a cover 17. In the preferred form of the invention as shown in the drawings, body 11 is annular and cover 17 has external perimetric measurements equal to the circumference of body 11. Accordingly, when cover 17 is in place, the jar presents a uniform appearance in size when viewed externally. However, the present invention also contemplates a jar in which the body 11 can be elliptical, retangular, triangular or in which the upper part of the body flares outwardly to form a neck having a dimension greater than the body or any other desirable shape although the neck section 15 will generally be annular. It is to be understood, however, that cavity 14 can be molded to conform to the shape of the wall 12 of body 11 so long as neck section 15 has an annular shape.

As mentioned hereinabove, neck section 15 is equipped with oversized threads 16. It is preferred that the threads have substantially flat horizontal surfaces 16a and vertical surfaces 16b, thereby permitting the molding of a neck section which has exceptional strength even though it is shaped from a relatively low density light weight material. In FIG. 5 the container thread 16 is shown to comprise a plurality of expanded beads in the direction of the shear force produced by screwing on a cap, i.e. a vertical plurality of interlocked expanded beads. The small circles shown in the container, including the thread 16 of FIG. 5, represent individual expanded beads in approximately proportional size to the container thread 16 at the desired density of the foam plastic. However, threads 16 can be undercut near their junction with neck section 15 or they can have a beveled or rounded surface area 16c as shown in FIG. 4. The size of threads 16 and strength of neck section 15 can vary widely depending upon the requirements necessary to provide a molded jar of suitable strength for specific conditions of use. In general, the threads and neck at thread root are of such construction as to withstand tensile, compressive and shear forces exerted when cover 17 is screwed tightly into place without damage to the threaded section. More specifically, the threads should be large enough in overall dimension and the neck of such strength as to withstand a torque of at least about 15 pound-inches without damage to the threads or slippage on the neck. The phrase "without . . . slippage on the neck" defines that property of a foam plastic jar having a threaded neck section to inhibit loosening of a threaded cover which is screwed tightly in place on the jar during movement of the covered jar, e.g., during shipping. Preferably, however, the ratio of the thread thickness at the base to the thread depth should be 1:1 or greater. The length of the threads also can vary, however, it is preferred that they extend around the neck of the jar for a sufficient length to lower the skirt 20 of the cover into direct contact with the wall of the jar. This gives additional protection against slippage.

A bead 18 is disposed around the substantially horizontal top surface of neck section 15. Bead 18 is preferably located around the inner edge of the neck section although it can be located around the outer edge or around the center. Bead 18 comes into direct contact with the top 19 of cover 17, thereby forming a direct seal and eliminating the need for a cover liner. Accordingly, simplified manufacture and reduced costs are achieved. In order to insure a good seal between bead 18 and top 19 the edge 15a of neck section 15 is molded to slope downwardly at an angle of about 20°. Such an arrangement provides concentration of pressure on the bead rather than on the edge of the neck when the cover is in place and prevents the top of the cover from striking the edge of the neck. Although such an arrangement is preferred, jars having excellent strength can be molded without a sloping edge on neck section 15. By coming into direct contact with top 19, the bead 18 also exerts an upward force on the cover 17 which causes the threads 16 of the neck and the cooperating threads 21 of the cover to be forced tightly against each other, thereby holding the cap securely so that it does not become loosened during handling, shipping and the like.

The cover 17 has a top member 19 and a circumferential depending skirt 20. The cover may be molded from the same material as the body 11 of the jar or it can be made of some other plastic material or metal. Preferably, however, cover 17 is pressed from metallic material and the internal surface of the skirt 20 is provided with threads 21 to cooperate with threads 16 of the neck section 15. The threads 21 of cover 17 can be provided by any suitable arrangement, that is, by stamping skirt 20 with thread impressions or as preferred in the interests of economy and simplicity of manufacture, by inserting a threaded metal or plastic strip 22 around the internal circumference of skirt 20. It is to be understood, however, that any type of standard threaded closure cap can be employed on the jars manufactured according to this invention.

As mentioned hereinabove the body 11 of a jar manufactured in accordance with the present invention is molded from a mass of synthetic resinous beads or particles or the like containing an expanding agent, generally a hydrocarbon which is well-known for its utility in forming synthetic resin foams. In their original state the beads or particles are small and of relatively high density. They are initially heated in the presence of air and steam to expand and form gas cells of a substantially uniform certain average density and size. Because of the aforedescribed process for preparing expanded beads, the size of the expanded beads is inherently roughly inversely proportional to the density of the beads. Subsequently, the expanded beads or particles are placed in a mold of desired shape and expanded still further while being molded to form the jar of this invention. In each stage of the operation a decrease in density takes place. When heated in a mold to form body 11, the mass of synthetic resinous beads or particles expands and the beads or particles are forced into contact with each other thereby resulting in a body formed from a multiplicity of closed or non-communicating cells.

In order to manufacture a jar having sufficient strength and which is light weight, the average density of the shaped foam material is generally in a range of about 3 to about 10 pounds per cubic foot. Although these densities are not critical, synthetic resin foams having an average density below 3 pounds per cubic foot generally do not form structures which exhibit desirable levels of strength and synthetic resin materials having average densities much above 10 pounds per cubic foot are not beneficial from an economic standpoint and provide strength in excess of requirements. Accordingly, synthetic resin foams having an average density of about 3 to 6 pounds per cubic foot are preferred. The resiliency of synthetic resin foams is an important factor in the attainment of a seal between the cover and container or jar manufactured in accordance with this invention. The particular foam employed to make a container should be resilient enough to conform to the cover surface where the lip of the container comes into contact with the top of the cover and also be strong enough to withstand, without damage to the threads, the compressive forces exerted by the cover when it is screwed tightly onto the container the threads of the neck section conforming to the cover threads. The synthetic resin foam plastics useful in the practice of this invention, defined more specifically hereinbelow, and having an average density within the range set out above present desirable properties of resiliency and compressibility as well as good strength. A jar manufactured in accordance with this invention from a polystyrene foam having an average density of 4½ pounds per cubic foot was exceptionally strong though light in weight and exhibited excellent properties of compressibility and resiliency. The initial density of the beads or particles employed and the amount of expansion necessary as well as the time and temperature needed to form a shaped foam body having the required density can be readily calculated by existing methods.

The synthetic resinous beads or particles employed in the practice of this invention can contain a dye or dyes of various colors. Thus, the body 11 can be a solid color, mottled in appearance, or undyed beads can be employed to produce a white colored body. The color of a jar can be used as a means of identification of the contents. In addition, the colors lend a pleasing esthetic value to the jar. This is especially so where a mixture of undyed beads and a multiplicity of beads or particles containing various colored dyes are employed to mold body 11. When a jar is molded from a mass of such beads, a body having a pleasing molted effect is attained.

As mentioned hereinabove, any thermoplastic synthetic resinous material which can be expanded or foamed as a result of or by application of heat thereto can be employed in manufacturing a container or jar in accordance with this invention. The prefoamed or partially expanded particulate materials containing a sufficient residue of expanding agent are available commercially in the form of beads and the like. Such materials include polystyrenes, polyurethanes and polyethylenes. The styrene polymers are generally representative of expandable thermoplastic resinous materials and particularly representative of resinous alkenyl aromatic compounds which contain at least about 50 percent by weight of at least one alkenyl aromatic compound having the general formula: $Ar-CR=CH_2$ wherein Ar is an aromatic radical, generally one containing about 6 to about 14 carbon atoms, including the carbon atoms in various substituents, such as alkyl groups, on the aromatic nucleus and R is selected from the group consisting of hydrogen and methyl with the balance being another ethylenically unsaturated monomeric material polymerizable with the alkenyl aromatic compound to provide thermoplastic resinous products (such as acrylonitrile, methyl methacrylate, etc.). Other expandable thermoplastic resinous materials can also be employed, including those which are comprised of polymers and copolymers of methyl methacrylate; thermoplastic polymers and copolymers of vinyl chloride; thermoplastic expandable ester and ether derivatives of cellulose acetate and so forth; expandable thermoplastic olefin polymers and copolymers, such as polyethylene, polypropylene, copolymers of ethylene and propylene and chlorinated polyolefins.

The expanding agents utilized in the expandable thermoplastic resinous material can be any of those which are commercially utilized for such purposes, including carbon dioxide, dichlorodifluoromethane, monochlorotrifluoromethane, pentane and other low boiling hydrocarbons and the like.

The expandable resinous materials are prepared with the necessary quantity of the particular expanding agent being employed that will result in the accomplishment of the desired expansion and efficient foaming of the thermoplastic mass upon application of heat. The required amount of expanding agent needed for a particular amount of expansion and efficient foaming can be readily determined by routine methods. The fugacious expanding agents can be incorporated into the resinous materials by any suitable process, such as the known procedures of including the expanding agent in the polymerization mass or pressing the expanding agent under proper conditions of pressure and temperature into the already prepared resinous materials desired to be rendered expandable.

If desirable, the expandable resinous material can also have incorporated therein an exothermous substance which is self-reacting to generate sufficient heat to expand the resinous material with or without the assistance of initiators, polymerization catalysts or curing agents. Among such substances known in the art are the precursors of epoxide resins such as 4,4'-dihydroxy diphenyl dimethyl methane and the like. Generally, the exothermous substance is simply incorporated into the resinous material by physical mixing.

Although a jar manufactured in accordance with this invention can be used to contain various materials without further manufacturing steps being required after molding, it is much preferred the the cavity 14 be lined or coated when it is to be used to hold volatile materials, such as aqueous and alcoholic media. Liners or coatings are helpful because the body of synthetic resinous foam may be gas permeable and sometimes is rather porous. Accordingly, the cavity 14 is preferably provided with a thin coating 24 of a microcrystalline wax, such as one having a melting point above about 110° F. and below about 190° F. Other suitable moistureproof waxy or synthetic organic plastic materials may be utilized to line or coat the cavity. Among the waxes mentioned, those melting within the temperature range given are capable of withstanding any temperature to which the jar is subjected during normal usage. Furthermore, they can be applied to the cavity of body 11 at a temperature that is not damaging to the foam structure during the coating process, and also provide excellent impervious cavity liners. The coating 24 adjoins bead 18 at the top of the cavity and acts to seal the jar, since it too comes into direct contact with top 19 of cover 17.

The sealing means, that is, the bead 18 and the top of coating 24 which is adjacent to or abuts the bead, preferably forming a flange 24a in contact with the bead, permits the use of a linerless moisture-impermeable cover to provide a leakproof moisture-tight container or jar. As will be seen, the upper surface of the coating or liner flange is at approximately the same height as the top of the foamed plastic bead. The bead is in contact with the edge of the flange and is located near the jar body inner wall. Thus, on tightening of the jar cap, such as an impermeable metal cap, the resilient foam is compressed slightly to conform with the cap sealing surface. The bead is flattened slightly and so is the foamed plastic under the flange of the microcrystalline wax coating or other liner material. The resilient compression of the plastic foam underneath the flange assists the moisture-proof flange in conforming to the cover and in making a moisture-tight seal. The foam plastic bead abutting the liner flange prevents lateral distortion of the flange in the direction of the jar threads, the presence of the liner limiting distortion in the other direction.

From the foregoing description of the conformance of foamed plastic jar surfaces with a cap member, it is evident that the present jars possess a highly desirable property, allowing tight fits to be obtained even when the jar and cover do not conform exactly in shape before being joined together. The resilience, which is of such importance, is attributable to the compressibility of the cells of air or other gas in the foam and at a density of 3 to 10, preferably 3 to 6 pounds per square inch, the gas content and resulting resilience are satisfactory for the present jars, whether made of polystyrene, polyethylene or of other of the well known plastics. The advantages described are not similarly obtainable with the usual solid synthetic plastics which, even if flexible, may distort unevenly under compression, causing leakage.

The use of a linerless cap of moisture-impermeable material and a foam plastic jar of the type described, including microcrystalline wax coating or equivalent liner, is advantageous especially in the case of packages for cosmetics, because it prevents loss of moisture or of contents that is normally transmitted through a cover liner. For example, studies have shown than an average of about 2.5 percent per year of moisture or volatile contents is often lost, due to vapor transmission through coated paper cover liners for glass jars. Such liners are employed because the glass jars usually do not conform exactly to the covers, and glass is non-compressible. On the other hand, the synthetic resin foam plastic employed in the present container or jar is readily compressible and holds the liner flange tightly against the cover, so that unlined covers may be employed and moisture losses through the liner may be avoided. Containers constructed in accordance with the invention, when equipped with covers such as those described, prevent loss of moisture or contents at the cover and reduce the loss to amounts less than the 2.5 percent normally lost via this route when glass or plastic jars equipped with lined closure caps are utilized.

The jar described herein presents many advantages. It is strong and will not crack or break under normal conditions of usage, although it is light in weight and of esthetically pleasing and delicate appearance. The jar can be manufactured by simple procedures from readily available materials. Moreover, it can be manufactured at reduced costs because of its simplicity of design, low cost of raw materials, absence of cap liner and other advantages.

The present invention provides a jar that is excellent for use as a cosmetic container. Where the cavity is not lined, the jar can be used for holding powders, such as talcum, bath salts, face powder, etc. Jars having coated or lined cavities make excellent containers for cleansing creams, cold creams, face makeup and the like but it will be readily apparent to those skilled in the art that the jar provided herein can also be utilized as a container for a wide variety of other materials.

Numerous modifications and embodiments of this invention can be made without departing from the spirit and scope thereof. Accordingly, it is to be understood that the invention is not to be limited to the embodiments disclosed herein, except as defined in the appended claims.

What is claimed is:

1. A container comprising a strong light weight integrally molded form-retaining body of resilient closed cell synthetic resin foam plastic having a density of about 3 to 6 pounds per cubic foot, including a unitary bottom and upwardly extending wall, an integrally molded threaded neck section of the same light weight, low density foam-retaining synthetic resin foamed plastic having a substantially horizontal annular area at the top thereof, an annular bead disposed on said annular area intermediate thereof, all defining an open top cavity lined with a coating of microcrystalline wax, said coating abutting the inner side of said bead, said neck having a sloping area of up to about 20°, said sloping area extending between the outer edge of said annular area and said threads, and a linerless threaded cover having a top member and a circumferential skirt depending from said top member and adopted to cooperate with said threaded neck section, and in which threaded neck section, the threads and neck at thread root are of such construction, by reason of a plurality of expanded interlocked beads in the direction of the shear force, as to withstand tensile, compressive and shear forces exerted by said threaded cover as it is screwed tightly into place to close the container without damaging the threaded section, said threaded neck section being capable of withstanding a torque of at least about 15 pound-inches, with the resilient cells of foam at the neck top, and in the bead whereby when said threaded cover is screwed into place said coating abutting the inner side of said bead comes into direct contact with said top of said cover thereby sealing said cavity of said container, and said sloping area provides concentration of pressure on said bead and prevents the top of said cover from striking said annular area, and the upper surface of said coating yieldingly conforming to the surface of said top member and the threads on the neck conforming to the cover threads, thereby allowing sealing of the container against leakage of contents and loss of moisture.

2. A container according to claim 1 wherein said microcrystalline wax has a melting point above 110° F. and below about 190° F.

References Cited by the Examiner

UNITED STATES PATENTS

| | | | |
|---|---|---|---|
| 2,090,699 | 8/1937 | Plunkett | 229—2.5 |
| 2,781,551 | 2/1957 | Richerod. | |
| 2,876,926 | 3/1959 | Gronemeyer | 220—39 |
| 2,942,301 | 6/1960 | Price et al. | |
| 2,988,528 | 6/1961 | Tench et al. | 229—3.1 |
| 3,027,286 | 3/1962 | Kurhan. | |
| 3,100,592 | 8/1963 | Orr | 229—3.1 X |
| 3,122,256 | 2/1964 | Orr | 215—43 |

THERON E. CONDON, *Primary Examiner.*

LOUIS G. MANCENE, *Examiner.*